Dec. 14, 1948.    D. A. SWEDLOW    2,456,093
METHOD OF POLYMERIZATION
Filed March 24, 1943

INVENTOR.
DAVID A. SWEDLOW
BY

Patented Dec. 14, 1948

2,456,093

UNITED STATES PATENT OFFICE 2,456,093

METHOD OF POLYMERIZATION

David A. Swedlow, Los Angeles, Calif., assignor, by mesne assignments, to Shellmar Products Corporation, Chicago, Ill., a corporation of Delaware Application March 24, 1943, Serial No. 480,322

8 Claims. (Cl. 154—140)

This invention is directed to the production of fibrous resinous products. It is known to produce fibrous resin structures by impregnating one or a plurality of superposed fibrous sheets with a polymerizable unsaturated compound and polymerizing the compound. Such a process often produces materials containing an excessive quantity of resin or which are nonuniformly cured or impregnated. Moreover, this process is often found to cause an excessive waste of resin which drains from the fabric during curing. Such drainage may often be so serious as to produce weak spots in the final product.

In accordance with my invention I have been able to avoid many of the difficulties encountered in prior processes, and have developed a process, which is capable of producing uniformly permeated and cured fibrous sheets and which affords a simple means of controlling the thickness and resin content of a fibrous laminate without loss of an excessive quantity of resin during drainage. In conducting this process I establish an assemblage comprising one or a plurality of superposed fibrous sheets impregnated with a measured quantity of a liquid polymerizable unsaturated material in a cell. This cell comprises a pair of glass or metal or resin plates or walls possessing some rigidity and serving as molds located on opposite sides of the laminate and provided with a compressible separator around the edges of the laminate. This separator may be of any compressible material such as rubber, a copolymer of vinyl chloride and vinyl acetate, principally vinyl chloride, sold under the trade name "Koroseal" by the B. F. Goodrich Co., polychloroprene, spring steel, etc. and serves as a gasket or separator whereby the plates or walls are movable with respect to each other. Thereafter a differential pressure is established between the interior and exterior of the cell to urge the molds or plates toward each other and to compress the impregnated fibrous material and the separating gasket.

Figure 2:
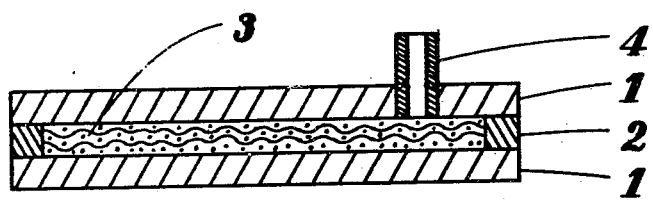
Figure 1:
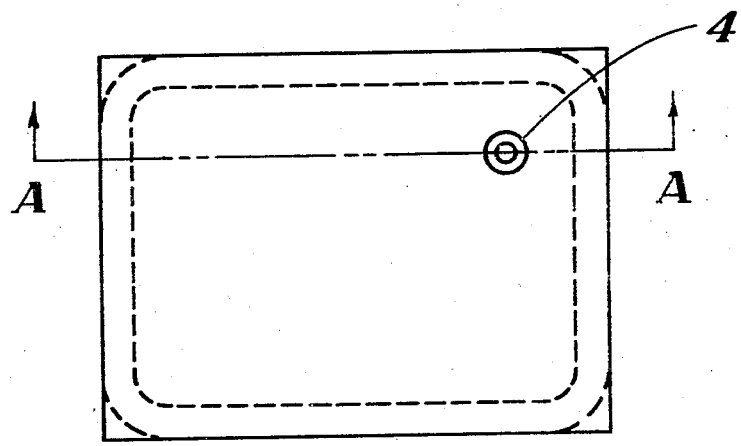

The invention will be more fully understood by reference to the accompanying drawing in which Fig. 1 is a plan view of a mold used in accordance with my invention and Fig. 2 is a cross-sectional view of the embodiment along line A—A of Fig. 1.

In accordance with the embodiment illustrated, fibrous base 3 which may comprise one or more layers and which is impregnated with a liquid or easily fusible polymerizable material is established within a cell comprising a pair of plates or molds 1. Preferably these molds should possess sufficient rigidity to retain their shape or form or to cause compression of the separator upon establishment of the differential pressure above mentioned. Often one or both may be sufficiently flexible to permit some flexing upon a differential pressure whereby the fibrous base may be compacted to a desired degree by the flexing of the mold wall or walls. The plates or molds may be flat or curved or of other shape. The plates are separated by a deformable gasket 2 capable of yielding under pressure and preferably capable of sealing the cell in order to permit establishment of a subatmospheric pressure within the cell. One or both of the plates 1 is provided with a port 4 communicating with the interior of the cell.

In the operation of the process a fibrous base or a plurality of superposed layers thereof may be impregnated with a polymerizable material by a convenient means. For example, the fibers may be impregnated by immersion in a pool of a liquid polymerizable material or they may be coated by means of a coating roll or brush. In accordance with one effective method the fibrous base may be placed upon a plate having a gasket 2 mounted upon the marginal edges thereof and a measured quantity of polymerizable liquid required to produce a product containing a desired resin content poured over the surface of the fibrous base. Thereafter the upper plate is placed upon the gasket and clamped to form the cell shown in the drawing.

The cell thus obtained is connected by means of port 4 to a suitable vacuum pump and is evacuated whereby air present in the fabric is removed and sufficient differential pressure is established upon the plates to compact the impregnated base and distribute the polymerizable material throughout the base. The degree of evacuation required should be sufficient to ensure production of a well bonded laminate and usually is sufficient to establish a differential pressure between the interior and exterior of the cell of 0.5 to several pounds per square inch, although the pressure may be more or less than this value in many cases.

The assembled cell is then heated or subjected to ultra-violet light or other means to polymerize the polymerizable material. If desired, the cell may be evacuated during the process of polymerizing provided the desired degree of evacuation is established before the polymer has become a gel or similar type of solid polymer. The evacuation of the cell is maintained until after the polymer has gelled or solidified. This may be accomplished by sealing or closing up port 4 by any convenient means. After polymerization has been carried to the required degree the plates or molds may be removed and a well bonded polymerized product is obtained.

The process may be used for the production of fibrous products impregnated with thermosetting or thermoplastic polymers from monomer or partially polymerized monomers, particularly those in liquid state. It is particularly effective when used in conjunction with polymerizable compounds containing two or more unsaturated unconjugated polymerizable groups. This includes the following:

1. Unsaturated alcohol esters of unsaturated acids such as the esters of vinyl, allyl methallyl, crotyl, beta ethyl allyl, propargyl, methyl propargyl, oleyl, linoleyl ricinoleyl, linallyl, phenyl propargyl or cinnamyl alcohol and unsaturated acids such as acrylic, methacrylic, alpha or beta chloracrylic, crotonic or cinnamic acids.

2. Unsaturated alcohol polyesters of polybasic acids such as phthalic, carbonic, oxalic, succinic, adipic, azalaic, sebacic and terephthalic acids including diallyl carbonate, diallyl maleate, diallyl fumarate, diallyl oxalate, diallyl adipate, diallyl itaconate, diallyl succinate, and mixtures thereof.

3. Polyhydric alcohol esters of the above unsaturated acids and polyhydric alcohols such as ethylene glycol, diethylene glycol, propylene glycol, dipropylene glycol, triethylene glycol, hexaethylene glycol, glycerol, sorbitol, mannitol, erythritol, polyvinyl alcohol or cellulose esters such as ethylene glycol diacrylate, ethylene glycol dimethacrylate, linseed oil, China-wood oil, etc.

4. Polyhydric alcohol polyesters of polybasic acids including esters of polyhydric alcohols and maleic, fumaric, itaconic or citraconic acid. Such esters may include alkyd type of glycol maleates or fumarates or compounds such as ethylene glycol bis (methyl fumarate), ethylene glycol bis (ethylene fumarate), etc.

5. Ethers including diallyl ether, divinyl ether, etc. and copolymers of the ethers and any of the above compounds.

6. Other organic compounds including divinyl benzene, divinyl naphthalene, vinyl acetylene, divinyl acetylene, etc.

In addition, the process may be applied to the treatment of other unsaturated compounds such as vinyl acetate, methyl acrylate, acrylonitrile, methyl methacrylate, ethyl methacrylate, butyl methacrylate, styrene, vinyl chloride, vinylidine chloride, methyl itaconate, methyl fumarate, methyl alpha chloracrylate, etc. or to copolymers thereof with the above polyfunctional materials.

The polymerization of the above materials is generally effected by means of heat and/or light and catalysts, such as benzoyl peroxide, acetone peroxide, acetyl peroxide, isopropyl peroxycarbonate, etc.

Various types of fibrous bases may be impregnated including felted or woven sheets or bats. Thus cotton sliver, glass or mineral wool or sliver, woven glass cloth, canvas, duck, muslin, paper, sisal, plywood, silk or nylon fabrics, etc. may be treated in accordance with this invention.

The walls of the cell may be of various convenient materials such as glass plates, aluminum or other metallic sheeting, plaster of Paris, synthetic resin sheets, etc. Generally these walls should possess sufficient rigidity to be capable of retaining a shape imparted thereto, whereby a more or less uniform compacting occurs upon evacuation of the cell and the walls move toward each other at least partially by reason of compression of the gasket. While the walls may possess substantial flexibility, it is preferable that they be substantially more rigid than ordinary fabric sheets which possess little or no intrinsic rigidity. Moreover it is desired that they possess a smooth surface in order to facilitate their removal from the polymerized fibrous base. Flat or curved sheets may be prepared through use of flat or curved molds or walls having the contour of the desired product whereby the sheet takes the form of the mold.

If desired, the cell may comprise one mold or wall of substantial rigidity which does not yield or flex substantially under differential pressure of 5 to 25 pounds per square inch such as plaster of Paris and a second wall of a more flexible material such as thin metal or plate glass or tempered glass. In such a case the flexible wall acts to compact the fibrous base when pressure is applied to the walls. Alternatively both walls may be of a highly rigid material and the pressure imparted to the fibrous base largely by compacting the flexible gasket. Moreover, the cell may comprise a pair of walls both of which possess substantial flexibility. As previously noted, the gasket may be of rubber, synthetic rubber, metal or other material preferably elastic in character capable of forming an air-tight seal between the molds and capable of being compressed to permit movement of the cell walls toward each other when a differential pressure is established between the interior and exterior of the cell.

The present process is found to be especially advantageous in affording a convenient method of controlling the thickness and resin content of a resinous fibrous base and securing a product of substantially uniform thickness and resin content throughout its entire area. Thus the resin content may be controlled simply by control of the amount of resin added. Often it may be desirable to add an excessive amount of polymerizable material to a fibrous base in order to insure a proper degree of impregnation. This excess may be withdrawn, after the cell has been assembled, during the evacuation and the evacuation step may be continued until the desired resin content has been reached. Thereupon the cell may be sealed by closing port 4 by any suitable means while the internal pressure within the cell is below atmospheric pressure.

The degree of differential pressure to be established between the interior and exterior of the cell is dependent upon the nature of the product desired. Thus if a highly compacted product of minimum resin content is to be obtained the cell is usually evacuated to a pressure of 100 to 200 mm. of mercury or less. On the other hand, satisfactory laminates of higher resin content may be secured by use of differential pressures as low as 0.5 pound per square inch or even lower. The nature of the product and the resin content to be secured may be readily controlled simply by control of the degree of evacuation.

The process herein contemplated is effective for the production of products free from blemishes and irregularities. By conducting the cure of the laminate or other product at a sub-atmospheric pressure the fabric is satisfactorily compacted and other advantages are achieved. For example, establishment of air bubbles or air spots in the fabric or inhibition of polymerization due to air is eliminated or minimized by conducting the polymerization under vacuum.

The invention is capable of numerous modifications. For example, while it is preferable to establish the differential pressure between the interior and exterior of the cell by evacuation, resinous products may be prepared by applying an exterior pressure to the walls of the cell. For example, the cells may be placed in a pressure chamber or an autoclave and subjected to pressures of 10 to 200 pounds per square inch or above during curing or they may be subjected to pressure by other means such as a heavy weight, a steam press, etc. While the process is especially effective when used with unsaturated polymerizable compounds, it may also be used in conjunction with other polymerizable materials such as alkyd resins or partially reacted alkyds, phenol-aldehyde, melamine-aldehyde or urealdehyde compositions which polymerize by condensation reactions. The following examples are illustrative:

Example 1

Eight layers of a woven glass fabric, 15 inches by 15 inches, were superposed and placed upon a glass plate, 16 inches by 16 inches, and a "Koroseal" gasket one-eighth inch in thickness was laid around the marginal edge of the glass. Thereupon 250 grams of diallyl maleate, containing 3 per cent benzoyl peroxide, was poured onto the fabric and the mixture was distributed between the layers and spread over the entire fabric area as uniformly as possible by rolling a roller back and forth over the fabric. A second glass plate was laid upon the gasket and the assemblage was clamped to form a cell as indicated in the drawing. The cell was then evacuated to a pressure of about 125 mm. of mercury and, after withdrawing 50 grams of diallyl maleate, the cell was sealed and the fabric cured according to the following cycle:

1 hour at 74° C.
2 hours at 78° C.
1¾ hours at 82° C.
1¼ hours at 86° C.
½ hour at 90° C.
½ hour at 95° C.
2 hours at 115° C.

The cell was then disassembled and a unitary well-bonded laminate, containing about 40 per cent resin, was obtained.

Example 2

The process of Example 1 was repeated using a mixture of 90 parts by weight of diallyl phthalate and 10 parts by weight of diallyl adipate.

Although the invention has been described with particular reference to the specific details of certain embodiments thereof, it is not intended that such details be regarded as limitations upon the scope of the invention except in so far as included in the accompanying claims.

I claim:

1. A method for polymerizing a fibrous base impregnated with a measured quantity of a polymerizable material, comprising permeating a fibrous base with a liquid polymerizable material in an amount in excess of the amount desired, placing the impregnated base in a closed, compressible cell provided with an outlet for material withdrawn from the base, removing the excess liquid polymerizable material from the base and, in turn, from the cell, and polymerizing the impregnated base.

2. A method for polymerizing a fibrous base impregnated with a measured quantity of a polymerizable material, comprising permeating a fibrous base with a liquid polymerizable material in an amount in excess of the amount desired, placing the impregnated base in a closed, compressible cell provided with an outlet for material withdrawn from the base, establishing a differential pressure between the exterior and interior of the cell to compact the base and force the excess liquid polymerizable material from the base and, in turn, from the cell, and polymerizing the impregnated base.

3. A method which comprises impregnating a fibrous base with an amount of liquid polymerizable material in excess of the amount desired in the final product, applying pressure thereto the impregnated base to compact the impregnated base and to remove the excess polymerizable liquid therefrom and maintaining the pressure on the base to uniformly distribute the residual polymerizable material throughout the base without further loss of said material from said base, and polymerizing the compacted base.

4. A method which comprises impregnating a fibrous base with an amount of liquid polymerizable material in excess of the amount desired in the final product, compacting the impregnated base while subjecting it to subatmospheric pressure removing the excess polymerizable liquid from the base, maintaining the said pressure on the base to uniformly distribute the residual polymerizable material throughout the base but without further loss of material therefrom, and polymerizing the compacted, impregnated base while maintaining it at subatmospheric pressure until the said liquid polymerizable material has been converted to the gel state.

5. A method which comprises placing a plurality of superposed fibrous layers impregnated with a liquid polymerizable material in an amount in excess of that desired in the final product in a closed cell comprising a pair of sidewalls movable with respect to each other and provided with a compressible separator to permit motion of the sidewalls toward each other, establishing a differential pressure between the interior and exterior of the cell to compact the layers through movement of the sidewalls toward each other and thereby remove the desired excess of polymerizable material from the layers and distribute the residual polymerizable material uniformly throughout the layers, and polymerizing the impregnated layers without further loss of polymerizable material therefrom.

6. A method which comprises establishing a fibrous base impregnated with a liquid polymerizable material in an amount in excess of that desired in the final product in a closed cell comprising a pair of sidewalls and a compressible separator, evacuating the cell to compress the fibrous base and to force the excess polymerizable material from the base and, in turn, from the cell, maintaining sufficient vacuum within the cell to compact the fibrous base and uniformly distribute the residual liquid therethrough, and polymerizing the impregnated base without further loss of polymerizable material therefrom.

7. A method which comprises providing a mold having movable mold members and a yieldably compressible wall forming gasket adapted to be placed between said mold members to form a contractible cell therewith, placing a fibrous base on one of said mold members so that its edges are surrounded by the wall forming gasket, applying a measurable quantity of polymerizable liquid to the fibrous base, moving the other mold member into contact with the yieldably compressible gasket to enclose the base and the liquid in the cell thus formed, evacuating the cell to compress the liquid between the mold members while permitting lateral movement of the gasket wall to accommodate lateral flow of the liquid whereby the liquid is uniformly distributed in the base and laterally confined by the gasket at the edges thereof, polymerizing the impregnated base without loss of polymerizable liquid from the cell while maintaining the same under vacuum at least until the polymerized liquid has been converted into the gell state and removing the polymerized product from the cell.

8. A method which comprises impregnating a fibrous base with an amount of a liquid polymerizable material which is at least as great as the amount desired in the final product, subjecting the impregnated base to sub-atmospheric pressure and compacting the impregnated base to remove any excess polymerizable material therefrom and to uniformly distribute the polymerizable material throughout the base and polymerizing the compacted impregnated base while maintaining the sub-atmospheric pressure at least until the polymerized liquid has been converted to the gell state.

DAVID A. SWEDLOW.

REFERENCES CITED

The following references are of record in the file of this patent:

UNITED STATES PATENTS

| Number | Name | Date |
|---|---|---|
| 1,274,206 | Shuman | July 30, 1918 |
| 1,284,296 | Frederick | Nov. 12, 1918 |
| 1,541,641 | Quay | June 9, 1925 |
| 1,782,023 | Lytle | Oct. 15, 1929 |
| 1,835,619 | Walsh | Dec. 8, 1931 |
| 2,105,567 | Webb | Jan. 18, 1938 |
| 2,154,639 | Rohm et al. | Oct. 18, 1939 |
| 2,236,552 | Ushakoff | Apr. 1, 1941 |
| 2,259,524 | Kistler | Oct. 21, 1941 |
| 2,270,285 | Frolich | Jan. 20, 1942 |
| 2,276,004 | Vidal et al. | Mar. 10, 1942 |
| 2,311,547 | Hutchison | Feb. 16, 1943 |
| 2,353,996 | Cooke et al. | July 18, 1944 |
| 2,362,672 | Sloan | Nov. 14, 1944 |
| 2,377,946 | Leary | June 12, 1945 |
| 2,397,827 | Williams | Apr. 2, 1946 |

FOREIGN PATENTS

| Number | Country | Date |
|---|---|---|
| 488,315 | Great Britain | July 5, 1938 |
| 519,795 | Great Britain | Apr. 5, 1940 |